(12) United States Patent
Soulier et al.

(10) Patent No.: US 8,573,934 B2
(45) Date of Patent: Nov. 5, 2013

(54) LOCKING DEVICE DESIGNED TO BE ARRANGED IN A JUNCTION REGION OF A NACELLE

(75) Inventors: Pascal-Marie Paul Marcel Soulier, Le Havre (FR); Aurélie De Sorbay, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 930 days.

(21) Appl. No.: 12/674,284

(22) PCT Filed: Aug. 8, 2008

(86) PCT No.: PCT/EP2008/060460
§ 371 (c)(1),
(2), (4) Date: Feb. 19, 2010

(87) PCT Pub. No.: WO2009/024487
PCT Pub. Date: Feb. 26, 2009

(65) Prior Publication Data
US 2011/0293414 A1 Dec. 1, 2011

(30) Foreign Application Priority Data
Aug. 20, 2007 (FR) ...................................... 07 05928

(51) Int. Cl.
*B64D 29/06* (2006.01)
*B64D 29/08* (2006.01)

(52) U.S. Cl.
USPC ..................................... 415/214.1; 244/129.4

(58) Field of Classification Search
USPC ........... 415/119, 126, 127, 128, 213.1, 214.1; 416/244, 244 A, 246, 31; 244/129.4, 244/129.5, 53 R, 54
See application file for complete search history.

(56) References Cited

U.S. PATENT DOCUMENTS 3,259,412 A * 7/1966 Wheeler ........................ 292/113
4,127,215 A * 11/1978 Morrison ...................... 220/314
4,759,574 A   7/1988 James
(Continued)

FOREIGN PATENT DOCUMENTS

EP   1091059       4/2001
WO   2006/033929   3/2006

OTHER PUBLICATIONS

International Search Report; PCT/EP2008/060460; Sep. 30, 2008.

*Primary Examiner* — Nathaniel Wiehe
*Assistant Examiner* — Joshua R Beebe
(74) *Attorney, Agent, or Firm* — Brinks Hofer Gilson & Lione

(57) ABSTRACT

The invention relates to a locking device (9) designed to be arranged in a junction region of a nacelle, comprising a locking system (10), intended to be mounted on a first half-shell of the nacelle, engaging with a retention member (11) intended to be mounted on a second half-shell, the locking system (10) being actuable between a locked state and an unlocked state with respect to the retention number (11), the locking system (10) and the retention member (11) being movable with respect to one another between a drawn-together position in which they can be locked with respect to one another and a spaced-apart position. The locking system (10) and/or the retention member (11) comprise locking means (25) designed to allow the locking system (10) to be locked with respect to the retention member (11) when they are in the drawn-together position and to prevent them from being locked when they are in the spaced-apart position.

7 Claims, 5 Drawing Sheets

(56) References Cited

U.S. PATENT DOCUMENTS

| | | | |
|---|---|---|---|
| 5,518,206 A * | 5/1996 | Arnold et al. | 244/129.4 |
| 5,984,382 A * | 11/1999 | Bourne et al. | 292/113 |
| 6,042,156 A | 3/2000 | Jackson | |
| 6,279,971 B1 * | 8/2001 | Dessenberger, Jr. | 292/113 |
| 6,517,027 B1 * | 2/2003 | Abruzzese | 244/129.4 |
| 6,666,408 B1 * | 12/2003 | De Carvalho et al. | 244/129.4 |
| 6,824,175 B2 * | 11/2004 | Porte | 292/113 |
| 2004/0104583 A1 | 6/2004 | Porte | |

* cited by examiner

LOCKING DEVICE DESIGNED TO BE ARRANGED IN A JUNCTION REGION OF A NACELLE

TECHNICAL FIELD

The disclosure relates to a locking device designed to be placed in a junction zone of a nacelle.

BACKGROUND

A nacelle is a streamlining element making it possible to protect a jet of an aircraft. A nacelle usually comprises a forward air-intake section, a middle section designed to surround a fan of the turbojet, and an aft section formed from at least a first and a second half-shells mounted rotatably on a pylon so as to be able to be deployed each between a working position and a maintenance position.

The two half-shells are linked together at top and bottom junction zones by means of locking devices.

A conventional locking device placed in the junction zone of the nacelle comprises a locking system designed to be mounted on a first half-shell of the nacelle, interacting with a retention member designed to be mounted on a second half-shell, the locking system being able to be actuated between a locked state and an unlocked state relative to the retention member, the locking system and the retention member being able to be moved relative to one another between a drawn-together position of the latter in which they can be locked relative to one another and a separated position of the latter.

Conventionally, the locking system is fitted with a handle which the maintenance operators tend to fold down for reasons of convenience so that this handle does not protrude from the wall of the nacelle in its bottom portion so as not to hamper the operator.

When the operator folds the handle down and the half-shells are in a position separated from one another, this may cause the locking of the locking system depending on the position of the latter.

The operator, seeing the two half-shells separated from one another, risks considering that the half-shells are correctly unlocked from one another although this is not the case. Therefore, this situation may at the least lead to harmful damage to the equipment when the two half-shells are separated.

BRIEF SUMMARY is the disclosure seeks to remedy this drawback by proposing a locking device making it possible to ensure a safe actuation of the locking system in order to prevent any accidental damage to the nacelle.

Accordingly, the disclosure relates to a locking device of the aforementioned type, wherein the locking system and/or the retention member comprise immobilization means, designed to allow the locking of the locking system relative to the retention member when the latter are in the drawn-together position, and to prevent their locking when the latter are in the separated position.

In this way, it is not possible to place the locking system in the locked position if the retention member is not capable of interacting with the latter. Therefore, while the half-shells are not correctly folded down, the locking system will necessarily remain in the unlocked position.

Advantageously, the locking system comprises a hook capable of engaging with the retention element, and an operating member interacting with the hook so as to achieve the engagement or disengagement of the latter relative to the retention member when the operating member is actuated, the immobilization means comprising linking means connected to the operating member and moved when the latter is actuated, and a member forming a movable stop that can be moved between an immobilization position in which the linking means rest against the member forming a movable stop when the operating member is actuated, and a release position in which the member forming a movable stop is separated from the trajectory of the linking means when the operating member is actuated.

In this manner, when the immobilization means are in the immobilization position, it is impossible to actuate the operating member which is for example a handle. Conversely, when the immobilization means are in the release position, that is to say when the two half-shells are in the position drawn together, the operating member can be actuated so as to lock the hook onto the retention member.

According to one embodiment, the linking means comprise an arm protruding outward, the member forming a movable stop taking the shape of a movable clapper fitted with a hook forming a stop.

In an exemplary embodiment, the member forming a movable stop is fitted with at least one actuation lug having an actuation end, the retention member comprising at least one pin the free end of which rests against the actuation end of the lug, in the drawn-together position of the locking system and of the retention member, so as to move the member forming a movable stop to the release position.

According to an exemplary embodiment, the member forming a movable stop is subjected to elastic return means suitable for moving it to the immobilized position.

Advantageously, the hook comprises a curved end capable of engaging with the retention element, the hook being mounted so as to pivot about an end spindle situated opposite the curved end, the locking system comprising a main spindle, designed to be fixedly attached to the first half-shell, an articulation comprising at least one compression link rod mounted so as to pivot about the main spindle and an intermediate spindle positioned between the main spindle and the end spindle, the linking means having a first branch designed to interact with the member forming a movable stop and a second branch connected to the first via a middle zone, the middle zone of the arm being mounted so as to pivot about the end spindle, the second branch being mounted so as to pivot about the intermediate spindle.

According to an exemplary embodiment, the member forming a movable stop is mounted so as to pivot about an articulation spindle designed to be fixed relative to the first half-shell.

The disclosure also relates to a turbojet nacelle comprising a forward air-intake section, a middle section designed to surround a fan of the turbojet, and an aft section formed from at least one first and one second half-shells mounted rotatably on a pylon so as to be able to be deployed each between a working position in which the half-shells are drawn together and a maintenance position in which the half-shells are separated from one another, characterized in that the nacelle is fitted, in a junction zone of the two half-shells, with at least one locking device according to the disclosure, the locking system being mounted on the first half-shell, the retention member being mounted on the second half-shell.

The disclosure also relates to an aircraft, characterized in that it comprises at least one nacelle according to the disclosure.

BRIEF DESCRIPTION OF THE DRAWINGS

In any case, the disclosure will be clearly understood with the aid of the following description with reference to the appended schematic drawing representing, as an example, one embodiment of this locking device.

DETAILED DESCRIPTION

Figure 1:
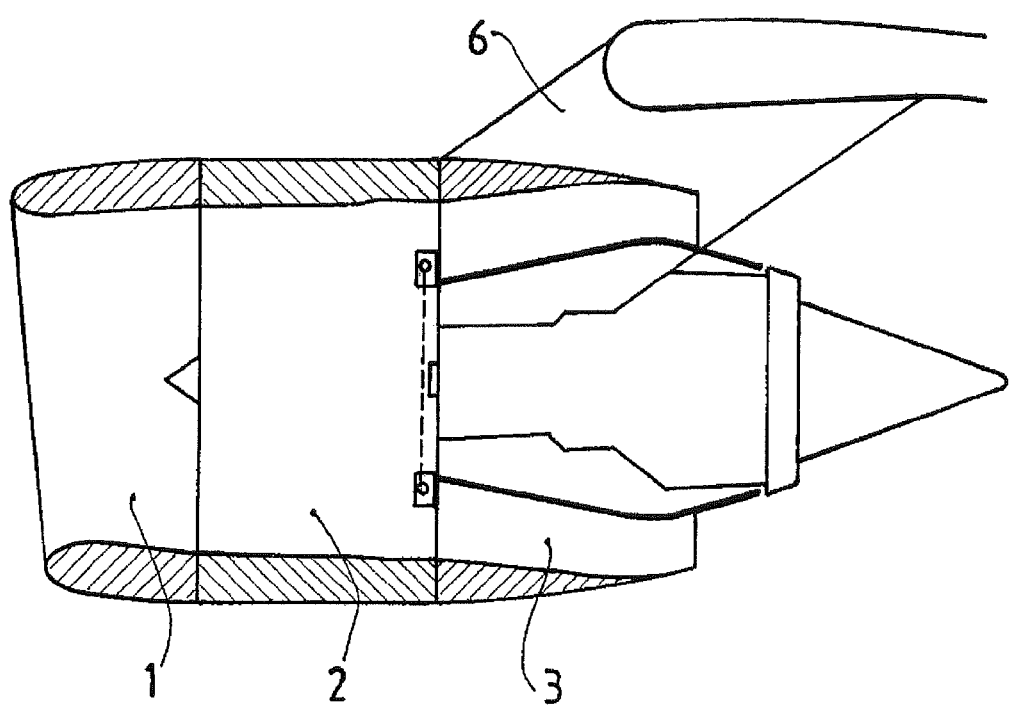
FIG. 1 is a schematic view of a nacelle in longitudinal section.
Figure 2:
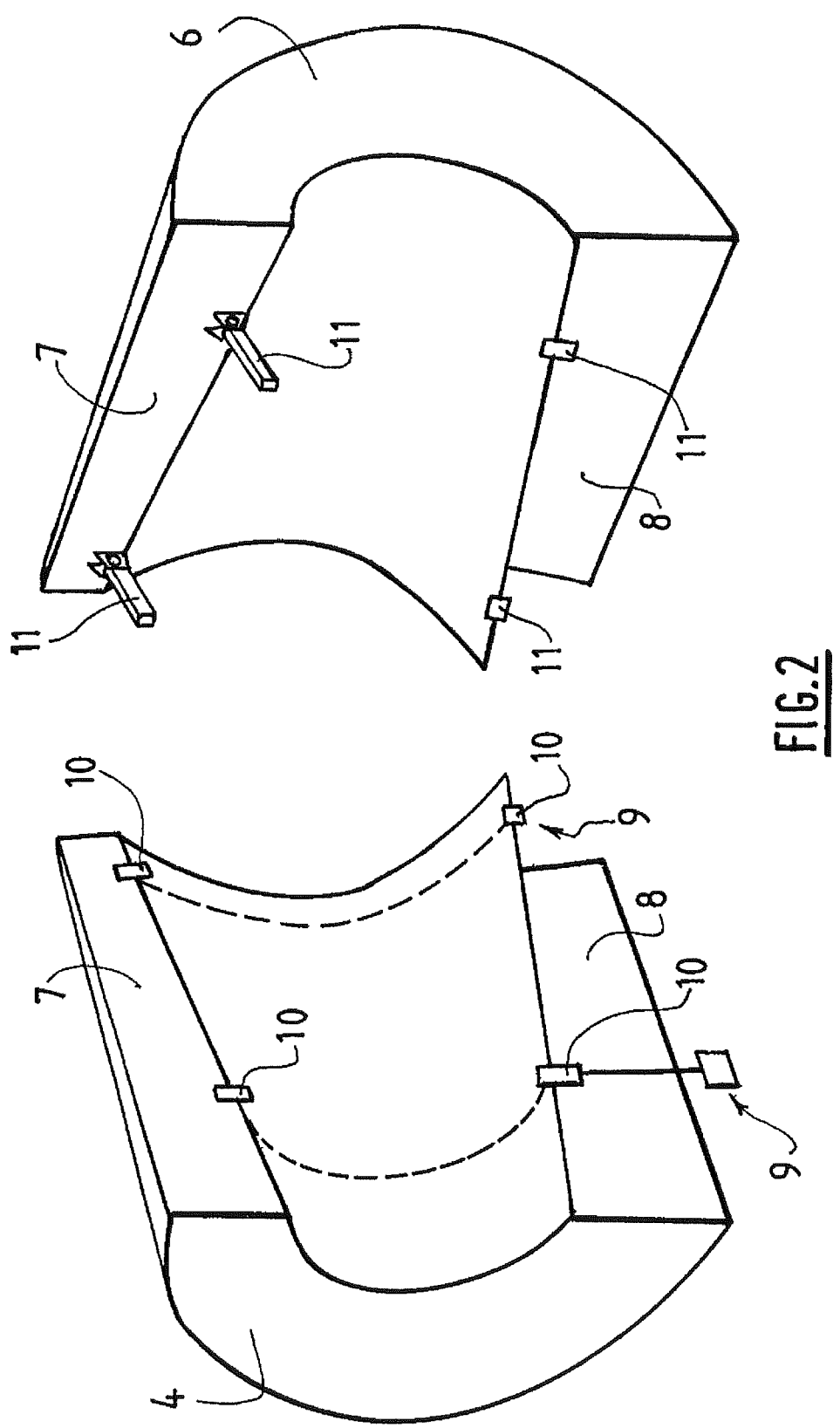
FIG. 2 is an exploded view of the nacelle, in perspective and seen from the front.

FIGS. 1 and 2 represent the general structure of a turbojet nacelle according to an exemplary embodiment. The latter comprises a forward air-intake section 1, a middle section 2 designed to surround a fan of the turbojet, and an aft section 3 formed from at least a first and a second half-shells 4, 5 mounted rotatably on a pylon 6 of an aircraft so as to be able to be deployed each between a working position and a maintenance position.

Each half-shell 4, 5 has the general shape of a hollow half-cylinder, delimiting two junction zones with the half-shell facing it, namely a top junction zone 7 and a bottom junction zone 8.

The bottom and top positions are also called respectively 6 o'clock and 12 o'clock positions.

The junction zones 7, 8 each comprise locking devices 9 comprising a locking system 10 and a corresponding retention member 11. The locking devices 9 of the top and bottom junction zones 7, 8 may or may not be connected together so as to achieve a simultaneous actuation of the locking devices. For reasons of clarity, only certain locking devices 9 have been shown.

Figure 3:
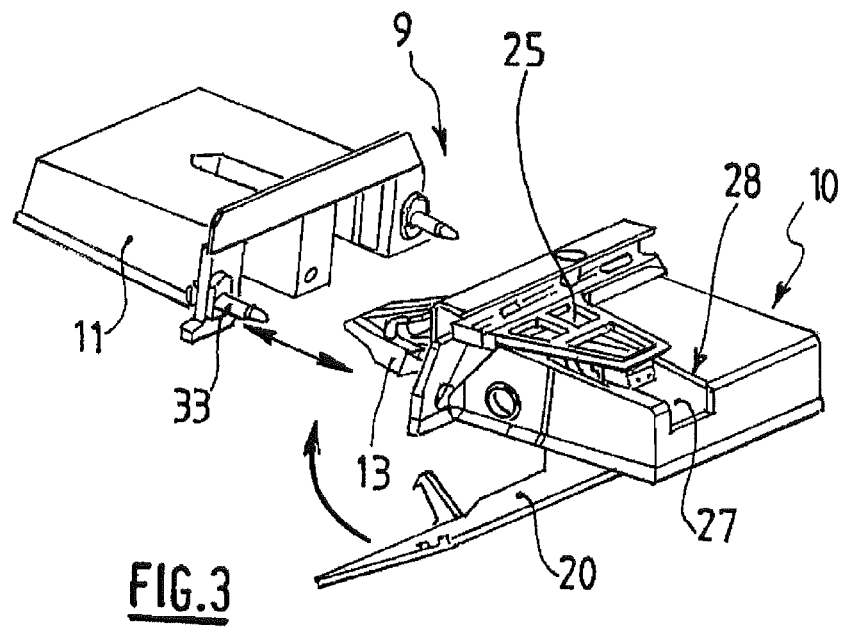
FIG. 3 is a view in perspective of the locking device in the separated position of the half-shells.

FIG. 3 represents such a locking device 9 in the separated position of the two half-shells 4, 5, that is to say in the separated position of the locking system 10 and of the retention member 11.

Figure 4:
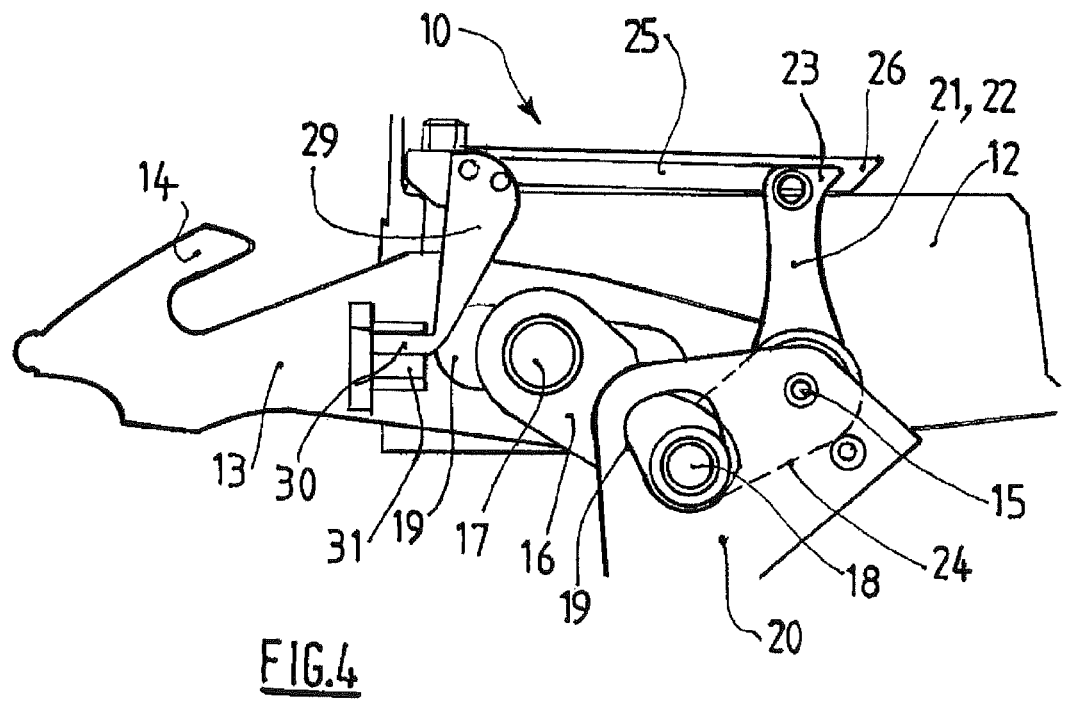
FIG. 4 is a front view in the separated position of the half-shells.
Figure 5:
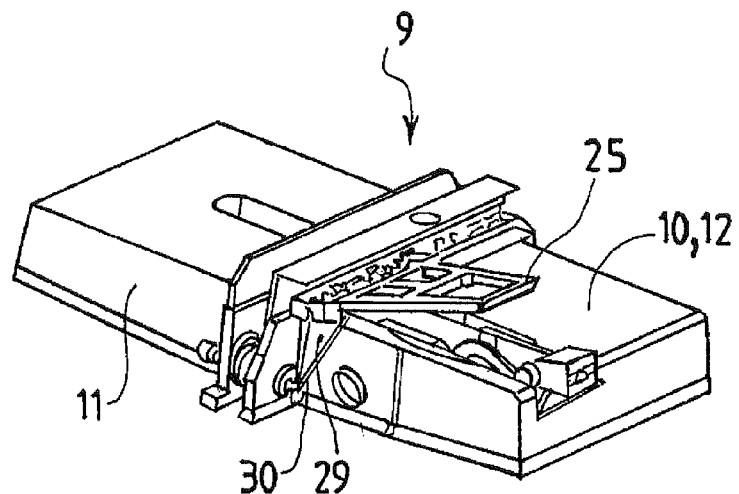
FIG. 5 is a view corresponding to FIG. 3, in the drawn-together position of the half-shells.

As appears more particularly in FIG. 4, the locking system 10 comprises a body 12 fixed to the first half-shell 4 and a hook 13 comprising a first curved end 14 and a second end mounted so as to pivot about an end spindle 15. The locking system 10 also comprises a compression link rod 16 mounted so as to pivot about a main spindle 17 fixed relative to the body 12 and an intermediate spindle 18 positioned between the main spindle 17 and the end spindle 15.

The main spindle 17 is mounted in an oblong opening 35 made in the hook 13, the intermediate spindle 18 being mounted in an opening 19 of a handle 20 mounted so as to pivot about the end spindle 15.

The structure of the locking system 10 is hitherto comparable to that described in patent WO 2005/014962.

The locking system 10 also comprises a linking arm 21 comprising a first branch 22 having a free end 23 the function of which is described below and a second branch 24 connected to the first via a middle zone, the middle zone of the arm being mounted so as to pivot about the end spindle 15, the second branch 24 being mounted so as to pivot about the intermediate spindle 18.

The locking system 10 is also fitted with a movable clapper 25, mounted so as to pivot on the body 12 at a first end and having a hook 26 at a second end, the hook 26 being designed to interact with the free end 23 of the first branch 22 so as to form a stop. The movable clapper 25 is subjected to the action of elastic return means tending to move the latter into its position shown in FIG. 4. The body 12 comprises an aperture 27 allowing the hook 26 of the movable clapper 21 to pass through, the edge 28 of the aperture 27 serving as the support of the movable clapper 25 in its aforementioned position.

The movable clapper 25 is fixedly connected, on either side of the latter, to a lug 29 at its first end, each lug 29 comprising a curved free end 30 for actuation of the movable clapper 25. The curved ends 30 protrude into orifices 31 arranged in the body 12.

The retention member 11, that can be seen in FIG. 3, is fixed to the second half-shell 5. The latter comprises a retention spindle 32, designed to interact with the curved end 14 of the hook 13 and it is visible more particularly in FIGS. 7 and 8. The retention member 11 also comprises two protruding pins 33, placed on either side of the retention spindle 32, designed to come to bear against the curved ends 30 of the lugs 29 of the locking system 10.

The operation of the locking device 9 will now be described in greater detail.

FIGS. 3 and 4 represent the locking device 9 in the separated position of the half-shells 4, 5. In this position, the locking system 10 is separated from the retention member 11 so that the pins 33 do not rest against the curved ends 30 of the lugs 29 and the movable clapper 25 is held resting against the edge 28 of the aperture 27 by the elastic return means. The movable clapper 25 is then placed in the immobilization position. Specifically, when the operator actuates the handle 20, that is to say pivots the latter in the counterclockwise direction, the arm 21 is rotated in the clockwise direction. The end 23 then butts against the hook 26 of the movable clapper 25 so that the rotation of the handle 20 is limited relative to the total travel necessary for locking the locking system 10 onto the corresponding retention member 11.

FIGS. 5 to 8 illustrate the locking device in the drawn-together position of the two half-shells 4, 5.

Figure 6:
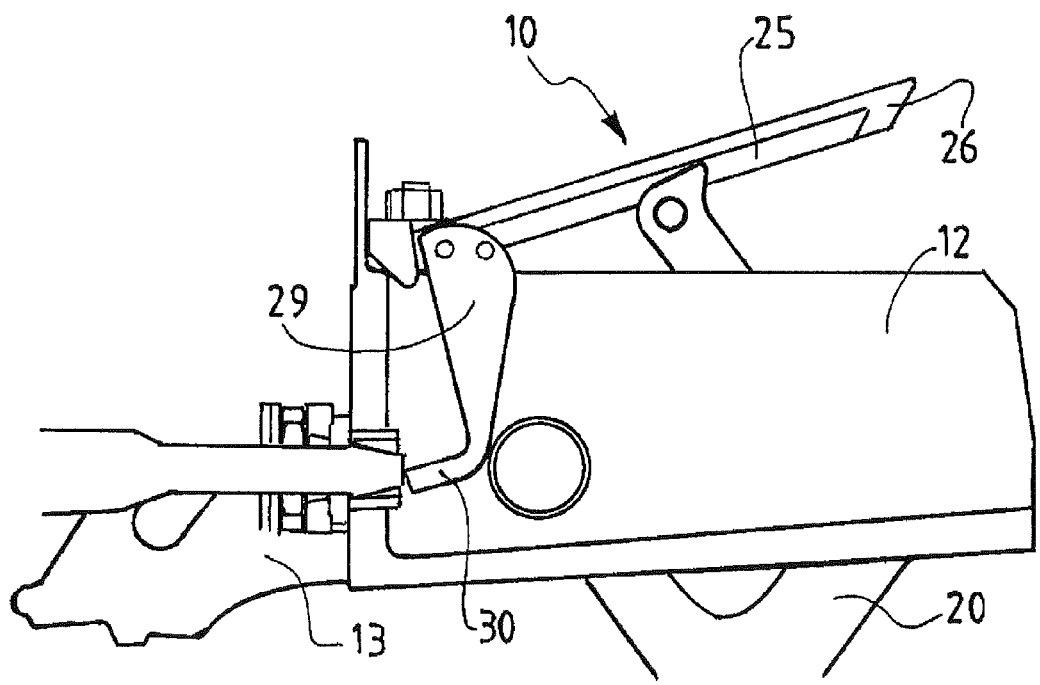
FIGS. 6 to 8 are views similar to FIG. 4, in the drawn-together position of the half-shells and in successive positions of actuation of the operating member.
Figure 7:
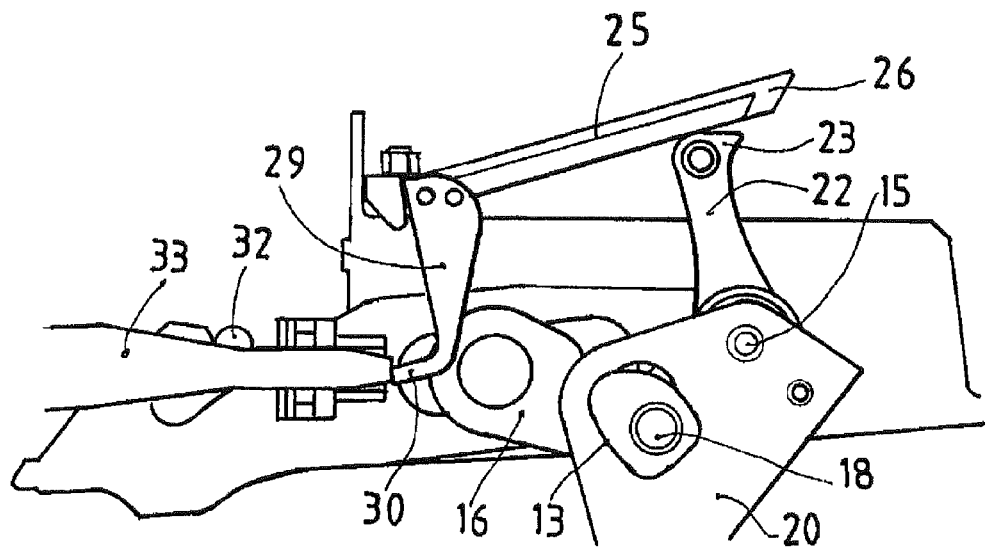
Figure 8:
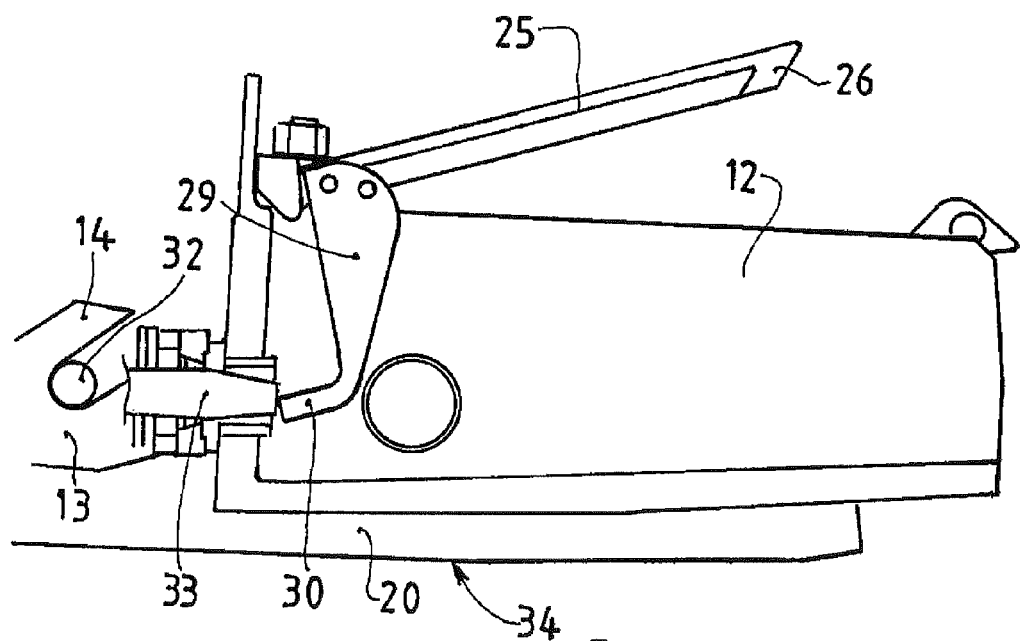

In this position, the pins 33 of the retention member 11 press against the corresponding ends 30 of the lugs 29, thereby causing the movable clapper 25 to pivot from its abovementioned immobilization position to a release position, illustrated more particularly in FIGS. 6 to 8.

In this position, the hook 26 of the movable clapper 25 is separated from the trajectory of the free end 23 of the arm 11 so that the rotary movement of the handle 20 is not hampered. In this manner, it is possible to move the hook 13 relative to the retention spindle 32, that is to say to unlock the locking system 10 relative to the retention member 11.

Such a locked position is illustrated more particularly in FIG. 8, only a portion of the pins 33 being represented in order to make the drawing easier to understand. In this position, the handle 20 is drawn to the hook 13, the outer surface 34 of the handle being, in this position, designed to be flush with the outer surface of the nacelle. Note that, in this position, the curved end 14 of the hook 13 has been moved relative to the retention spindle 32 so as to lock the two half-shells 4, 5 relative to one another.

As it goes without saying, the disclosure is not limited solely to the embodiment of this locking device described above as an example, but, on the contrary, it embraces all the variants.

The invention claimed is:

1. A locking device designed to be placed in a junction zone of a nacelle, the locking device comprising:
    a locking system, designed to be mounted on a first half-shell of the nacelle, interacting with a retention member designed to be mounted on a second half-shell, the locking system being able to be actuated between a locked state and an unlocked state relative to the retention member, the locking system and the retention member being able to be moved relative to one another between a drawn-together position of the latter in which they can be locked relative to one another and a separated position of the latter, the locking system and/or the retention member comprising immobilization means, designed to allow the locking of the locking system relative to the retention member when the latter are in the drawn-together position, and to prevent their locking when the latter are in the separated position, the locking system comprising a hook capable of engaging with the retention member, and an operating member interacting with the hook so as to achieve the engagement or the disengagement of the latter relative to the retention member when the operating member is actuated, wherein the immobilization means comprise linking means connected to the operating member and moved when the latter is actuated, and a member forming a movable stop that can be moved between an immobilization position in which the linking means rest against the member forming the movable stop when the operating member is actuated, and a release position in which the member forming the movable stop is separated from the trajectory of the linking means when the operating member is actuated, the member forming a movable stop being fitted with at least one actuation lug having an actuation end, the retention member comprising at least one pin the free end of which rests against the actuation end of the lug, in the drawn-together position of the locking system and of the retention member, in order to move the member forming a movable stop to the release position.

2. The device as claimed in claim 1, wherein the linking means comprise an arm protruding outward, the member forming a movable stop taking the shape of a movable clapper fitted with a hook forming a stop.

3. The device as claimed in claim 1, wherein the member forming a movable stop is subjected to elastic return means suitable for moving it to the immobilized position.

4. The device as claimed in claim 1, wherein the hook comprises a curved end capable of engaging with the retention element, the hook being mounted so as to pivot about an end spindle situated opposite the curved end, the locking system comprising a main spindle, designed to be fixedly attached to the first half-shell, an articulation comprising at least one compression link rod mounted so as to pivot about the main spindle and an intermediate spindle positioned between the main spindle and the end spindle, the linking means having a first branch designed to interact with the member forming a movable stop and a second branch connected to the first via a middle zone, the middle zone of the arm being mounted so as to pivot about the end spindle, the second branch being mounted so as to pivot about the intermediate spindle.

5. The device as claimed in claim 1, wherein the member forming a movable stop is mounted so as to pivot about an articulation spindle designed to be fixed relative to the first half-shell.

6. A turbojet nacelle comprising a forward air-intake section, a middle section designed to surround a fan of the turbojet, and an aft section formed from at least one first and one second half-shells mounted rotatably on a pylon so as to be able to be deployed each between a working position in which the half-shells are drawn together and a maintenance position in which the half-shells are separated from one another, characterized in that the nacelle is fitted, in a junction zone of the two half-shells, with at least one locking device as claimed in claim 1, the locking system being mounted on the first half-shell, the retention member being mounted on the second half-shell.

7. An aircraft employing at least one nacelle with the locking device as claimed in claim 1.

* * * * *